Patented May 9, 1950

2,506,580

UNITED STATES PATENT OFFICE 2,506,580

MANUFACTURE OF SULFURIC ESTERS OF LEUCO VAT DYESTUFFS

Samuel Coffey, George William Driver, David Alexander Whyte Fairweather, and Francis Irving, Manchester, England, assignors to Imperial Chemical Industries, Limited, a corporation of Great Britain No Drawing. Application March 25, 1947, Serial No. 737,106. In Great Britain March 26, 1946

6 Claims. (Cl. 260—316)

This invention relates to the manufacture of dyestuffs and intermediates and in particular to the manufacture of the sulphuric esters of leuco derivatives of vat dyestuffs and dyestuff intermediates and the salts thereof.

The production of ester derivatives of vat dyestuffs for the direct dyeing or printing of fabrics is well known and processes have been described for the manufacture of these ester derivatives directly from the vat dyestuff by treating the vat dyestuff in suspension in a tertiary base in the presence of a metal with sulphur trioxide or a substance which can give rise to sulphur trioxide in the reaction mixture such as for example an alkyl sulphuric acid halide or non-alkylated sulphuric acid chloride or a salt thereof or fuming sulphuric acid or a salt of pyrosulphuric acid or with pyrosulphuryl chloride. Processes have also been described in which these reactions are carried out in the presence of diluents, preferably diluents such as for example acetone and nitrobenzene, which do not react with the esterifying agent.

It has been proposed to use various tertiary bases such as, for example, pyridine, quinoline and dimethylaniline in the above reaction but only pyridine and certain homologues of pyridine have hitherto been widely used in the commercial applications of the reaction. Furthermore the use of inert diluents with the pyridine has not been successful in practice and has not been widely used in commercial applications of the reaction.

The use of pyridine in the above reaction has however certain disadvantages. Pyridine itself is expensive and a comparatively large amount is usually required. Furthermore the yield and quality of the leuco sulphuric ester derivative is not satisfactory with many vat dyestuffs. Also it has not hitherto been found possible to convert certain classes of vat dyestuffs into their leuco sulphuric esters by the use of pyridine or other tertiary bases in the above reaction.

The objects of this invention are to provide a cheaper process for the manufacture of ester derivatives directly from vat dyestuffs and dyestuff intermediates and to provide a process which will be more widely applicable than the processes hitherto known.

We have found that improved results are obtained in the manufacture of leuco sulphuric ester derivatives of vat dyestuffs and dyestuff intermediates, and the salts thereof, by using a modified process characterised in that the sulphation is carried out in the presence of an organic amide in which the hydrogen atoms attached to the amide nitrogen atom have been replaced by hydrocarbon radicles or substituted hydrocarbon radicles.

According to our invention therefore we provide a process for the production of a derivative of a dyestuff or dyestuff intermediate characterised in that the dyestuff or dyestuff intermediate is treated in the presence of a metal and an organic amide in which the hydrogen atoms attached to the amide nitrogen atom have been replaced by hydrocarbon radicles or substituted hydrocarbon radicles, with or without the addition of diluents, with sulphur trioxide or with a substance which can give rise to sulphur trioxide in the reaction mixture, either alone or in the presence of other substances which may be added if desired.

The reaction can be applied to anthraquinone and its derivatives and to indigo and its derivatives.

Examples of specific compounds to which the reaction may be applied are anthraquinone, 2-chloroanthraquinone, 2 - chloro-3-acetylaminoanthraquinone, 1:4 - dibenzoylaminoanthraquinone, 1:4 - di - (m-methane-sulphonylbenzoylamino)-anthraquinone, 16:17-dimethoxy-dibenzanthrone, 4:10 - dibromoanthanthrone, dibenzpyrenequinone, 1:1':4:1" - trianthrimidecarbazole, tetrabromindigo and thioindigo.

As examples of suitable amides for use in the reaction there may be mentioned dimethylformamide, diethylformamide, dimethylacetamide, diethylacetamide, tetramethylurea, formyl- and acetyl-piperidide, formylmorpholide, tetra-methyladipamide, dimethylbenzamide, dimethylurethane, N - methylacetanilide and N - methylphthalimidine.

The diluents which are used may be diluents which have comparatively little effect on the course of the reaction such as for example acetone, methylethylketone, acetonitrile, benzonitrile, benzene or nitrobenzene or they may be diluents which materially modify the reaction conditions and the course of the reaction. Thus for example it is possible to add a tertiary base such as for example pyridine or triethylamine and the use of such a base together with an amide as hereinbefore defined allows the basic nature of the reaction mixture to be varied and controlled so that the reaction conditions necessary for forming sulphuric ester derivatives from a wide range of compounds can be obtained.

As examples of substances which can give rise to sulphur trioxide in the reaction mixture there may be mentioned the addition compound of sulphur trioxide and dimethylformamide, chlorosulphonic acid and methyl and ethyl chlorosulphonates. As examples of suitable metals for use in the reaction there may be mentioned iron, nickel, copper and brass and as examples of other substances which may be added to the reaction mixture if desired there may be mentioned quaternary ammonium salts for example tetramethylammonium chloride.

The invention is illustrated but not limited by the following examples in which the parts are by weight.

Example 1

9.5 parts of sulphur trioxide are added to 24 parts of dimethylformamide with cooling and 15.6 parts of 16:17-dimethoxydibenzanthrone are then added. The mixture is stirred at 20° C. and 6.8 parts of finely divided brass powder (20% zinc) are added. The mixture is then stirred at 20° C. for 1 hour and poured into a solution of 11 parts of caustic soda in 150 parts of water. The suspension is heated to 50° C. and the metal residues are removed by filtration. The filtrate is then evaporated to dryness.

In place of dimethylformamide used in this example the same quantity of diethylformamide may be used.

Example 2

To a solution of dimethylformamide sulphur trioxide made by reacting 8.6 parts of sulphur trioxide with 26 parts of dimethylformamide, there are added 15 parts of tetrabromoindigo and 6 parts of brass. The mixture is stirred for 3 hours at 30° C. and then poured into a solution of 15 parts of caustic soda in 180 parts of water. The suspension is filtered and the leuco sulphuric ester is salted out from the filtrate with sodium chloride, filtered off and dried.

Example 3

10.4 parts of methyl chlorosulphonate are added to a mixture of 30 parts of dimethylformamide and 16 parts of acetone with cooling. 4.5 parts of 1:4-dibenzoylaminoanthraquinone and 1.2 parts of finely divided iron powder are added to the resulting solution at 15° C. The mixture is stirred for 1½ hours at 15° C. and is then poured into 240 parts of 5% sodium carbonate solution. The iron residues are separated by filtration. The yellow coloured filtrate is extracted with benzene to remove dimethylformamide and concentrated in vacuo. The sulphuric ester is salted out, filtered off and dried.

Example 4

15.6 parts of methyl chlorosulphonate are added to a mixture of 12.5 parts of dimethylformamide and 10.5 parts of acetone at 10–15° C. The mixture is heated to 20° C. and 4.2 parts of finely divided anthraquinone and 2.4 parts of iron powder are then added. The mixture is stirred for 1 hour at 20° C. and then poured into 200 parts of cold water containing 16 parts of sodium carbonate. The suspension is filtered, the filtrate concentrated and the sodium anthrahydroquinone disulphuric ester is salted out, filtered off and dried.

Example 5

23.2 parts of methyl chlorosulphonate are added to a mixture of 18.5 parts of dimethylformamide and 16 parts of acetone with cooling. 6.5 parts of 1:1':4:1''-trianthrimidecarbazole and 4 parts of iron powder are added to the mixture at 20° C. in 15 minutes. The mixture is stirred at 20° C. for 5 hours and then poured into 230 parts of 10% sodium carbonate solution. The suspension is filtered and the dyestuff is isolated by evaporating the filtrate under reduced pressure.

Example 6

A mixture of 23 parts of formylpiperidide and 16 parts of acetonitrile is cooled during the addition of 13 parts of methylchlorosulphonate. 4.2 parts of anthraquinone and 3 parts of iron powder are then added. The reaction mixture is stirred for 1 hour at 15° C. and then poured into 250 parts of water containing 16 parts of sodium carbonate. The metal residues are separated by filtration and the filtrate is distilled in vacuo. The anthrahydroquinone disulphuric ester is salted out from the filtrates in substantially quantitative yield.

Instead of acetonitrile there may be used as diluent benzonitrile, acetone or methylethyl ketone.

Example 7

The iron powder used in Example 4 is replaced by an equal weight of finely divided nickel powder and the reaction is carried out at 40–50° C. instead of 20° C. Sodium anthrahydroquinone disulphuric ester is obtained in high yield.

Example 8

10.2 parts of tetramethyladipamide and 24 parts of acetone are stirred and cooled during the addition of 6.5 parts of methylchlorosulphonate. 5.2 parts of indigo and 2.4 parts of iron powder are then added. The mixture is heated to 50° C. and stirred at this temperature for 45 minutes. The leuco sulphuric ester is isolated by pouring the reaction mixture into 200 parts of 5% sodium carbonate solution, filtering, concentrating the filtrates by vacuum distillation and salting out.

Example 9

A mixture of 20 parts of diethylacetamide and 15 parts of acetonitrile is stirred and cooled during the addition of 7.1 parts of chlorosulphonic acid. 3.75 parts of 4:10-dichloroanthanthrone and 3.2 parts of copper powder are then added. The mixture is stirred for 3 hours at 40° C. and then poured into 300 parts of 5% sodium carbonate. The metal residues are separated by warming the suspension and filtering. The leuco sulphuric ester is salted out from the filtrates as a bright yellow crystalline precipitate.

Example 10

A mixture of 15 parts of dimethylformamide and 9 parts of benzene is stirred and cooled during the addition of 7.1 parts of chlorosulphonic acid. 6.2 parts of dimethoxydibenzanthrone and 3.2 parts of copper powder are then added. The mixture is stirred at 15° C. for 1 hour and then poured into dilute sodium carbonate solution. The suspension is vacuum distilled to remove benzene and to concentrate and is then filtered. The residue is washed with water and the leuco sulphuric ester is salted out from the combined filtrates and washings.

Example 11

10 parts of N-formylmorpholide are added to 5 parts of acetone and 3 parts of ethylchlorosulphonate are then added to the cooled mixture. 2.1 parts of 1:4-di(m-methanesulphonylbenzoylamino)-anthraquinone and 0.5 part of iron powder are then added and the mixture is stirred at 15–20° C. for 2 hours. The leuco sulphuric ester is isolated in high yield as a yellow crystalline substance by pouring the reaction mixture into 100 parts of 5% sodium carbonate, filtering the suspension and then concentrating and salting the filtrates.

Example 12

25 parts of dimethylformamide are stirred and cooled during the addition of 7.1 parts of chlorosulphonic acid. 3 parts of thioindigo and 2.5 parts of copper powder are then added. The reaction mixture is stirred at 40-50° C. for about 30 minutes until the red colour has disappeared. The leuco sulphuric ester is isolated by pouring the reaction mixture into sodium carbonate solution, filtering the suspension and salting out from the filtrate by means of common salt.

Example 13

13 parts of N-dimethylbenzamide are dissolved in 24 parts of acetone, and 6.5 parts of methyl chlorosulphonate are added. 3 parts of 2-chloro-3-acetylaminoanthraquinone and 1.5 parts of iron powder are then added.

The mixture is stirred for 1 hour at 30-35° C. and the 2-chloro-3-acetylaminoanthrahydroquinone disulphuric ester is isolated by adding the reaction mixture in to an aqueous solution of 8 parts of sodium carbonate, filtering off the metal residues, evaporating the filtrate in vacuo to a concentrated solution and salting out with potassium chloride.

Example 14

A mixture of 16 parts of acetone and 5.8 parts of tetramethylurea are stirred and cooled during the addition of 6.5 parts of methylchlorosulphonate and then 3 parts of 2-chloro-3-acetylaminoanthraquinone and 1.5 parts of iron powder. Stirring is continued for 1½ hours at 35-40° C. and the product is isolated as in the previous example.

Example 15

5.8 parts of chlorosulphonic acid are added slowly with stirring and cooling to 20 parts of tetramethylurea. 3.3 parts of dibenzpyrenequinone and 2.5 parts of copper powder are then added. The mixture is heated to 45° C. and stirred at that temperature for ½ hour. The mixture is then added to a solution of 10 parts of sodium carbonate in 100 parts of water and the suspension so obtained is filtered. The residues are washed with hot water. The leuco sulphuric ester is precipitated from the combined filtrates and washings by the addition of common salt.

Example 16

7.8 parts of methyl chlorosulphonate are added to 10 parts of dimethylurethane and the mixture is heated to 100° C. and stirred at that temperature for 20 minutes. The mixture is cooled to 20° C. 5.2 parts of 16:17-dimethoxydibenzanthrone are added and then 3 parts of copper powder, and 12 parts of acetonitrile. The mixture which rapidly turns red in colour is stirred for some hours until all the vat dyestuff is converted to the leuco sulphuric ester. The reaction mixture is poured into dilute sodium carbonate solution, the suspension concentrated and then filtered and the residue washed with water. The leuco sulphuric ester is then salted out from the combined filtrates and washings.

Example 17

A suspension of 12.2 parts of N-methylacetanilide in 20 parts of acetonitrile is stirred and 5.4 parts of methyl chlorosulphonate are added. The reaction mixture is stirred at 20° C. for about 15 minutes to complete the reaction. To the clear solution so obtained 3.8 parts of 4:10-dibromoanthanthrone and 1.5 parts of iron powder are added. Stirring is continued at 20-22° C. when the vat dyestuff goes into solution and after a short time the leuco sulphuric ester is precipitated as a yellow crystalline substance. The reaction is complete in about 30 minutes and the reaction mixture is then added to a solution of 8 parts of sodium carbonate in 200 parts of water. The suspension is distilled in vacuo and filtered. The residue is washed with hot water to dissolve the leuco ester retained on the filter, and the filtrates and washings are salted with common salt to precipitate the leuco sulphuric ester.

Example 18

7 parts of N-methylphthalimidine are added to 20 parts of acetone and 3.1 parts of methyl chlorosulphonate are added to the stirred mixture. The mixture is heated to 50° C. for 30 minutes and then cooled at 20° C. To the white suspension so obtained 1.2 parts of 2-chloroanthraquinone and 0.8 part of iron powder are added and stirring is continued at 20° C. for 2 hours. The reaction mixture is poured into a solution of 5 parts of sodium carbonate in 100 parts of water and the suspension is filtered. The leuco sulphuric ester is isolated by salting out from the filtrate after vacuum distillation.

Example 19

7.8 parts of methyl chlorosulphonate are added to a cooled mixture of 15.4 parts of acetopiperidide and 25 parts of benzonitrile. 4.6 parts of 4:10-dibromoanthanthrone, 2.5 parts of iron powder and 2 parts of tetramethylammonium chloride are then added. The reaction mixture is stirred for 1 hour at 45-50° C. and the yellow suspension so obtained is poured into 10 parts of sodium carbonate dissolved in 200 parts of water. The suspension so obtained is distilled in vacuo. The leuco sulphuric ester is then isolated as described in Example 17.

We claim:

1. A process for the manufacture of leuco sulphuric ester derivatives of vat dyestuff and vat dyestuff intermediate compounds which comprises treating the oxidized form of the vat compound, in the presence of a non-vattable organic amide of a carboxylic acid in which the hydrogen atoms attached to the amide nitrogen atom have been replaced by hydrocarbon radicles and a metal selected from the group consisting of iron, nickel, copper and brass, with a sulphur compound which will give rise to sulfur trioxide in the mixture and recovering the leuco sulphuric ester derivative of the compound from the reaction mixture.

2. A process for the manufacture of leuco sulphuric ester derivatives of vat dyestuff and vat dyestuff intermediate compounds which comprises treating the oxidized form of the vat compound, in the presence of a non-vattable organic amide of a carboxylic acid in which the hydrogen atoms attached to the amide nitrogen atom have been replaced by hydrocarbon radicles and a metal, with sulfur trioxide and recovering the leuco sulphuric ester derivative of the compound from the reaction mixture, said metal being selected from the group consisting of iron, nickel, copper and brass.

3. A process for the manufacture of leuco sulphuric ester derivatives of vat dyestuff and vat dyestuff intermediate compounds which comprises treating the oxidized form of the vat compound, in the presence of dimethylformamide and a metal selected from the group consisting of iron, nickel, copper and brass, with sulphur trioxide and recovering the leuco sulphuric ester derivative of the compound from the reaction mixture.

4. A process for the manufacture of leuco sulphuric ester derivatives of vat dyestuff and vat dyestuff intermediate compounds which comprises preparing a mixture containing sulphur trioxide and a non-vattable organic amide of a carboxylic acid in which the hydrogen atoms attached to the amide nitrogen atom have been replaced by hydrocarbon radicles, adding to the mixture the vat compound in oxidized form and a metal selected from the group consisting of iron, nickel, copper and brass, stirring the mixture until the compound is converted to the leuco sulphuric ester derivative, adding the reaction mixture to an alkaline solution, and recovering the leuco sulphuric ester derivative from the solution.

5. A process for the manufacture of leuco sulphuric ester derivatives of vat dyestuffs which comprises mixing a non-vattable organic amide of a carboxylic acid in which the hydrogen atoms attached to the amide nitrogen have been replaced by hydrocarbon radicles with a sulphur trioxide compound which will give rise to sulphur trioxide in the mixture, adding to the mixture a vat dyestuff in the oxidized form and a metal selected from the group consisting of iron, nickel, copper and brass, stirring the mixture until the dyestuff is converted to the leuco sulphuric ester derivative, pouring the reaction mixture into an aqueous alkaline solution, filtering the resulting suspension, and recovering the leuco sulphuric ester derivative from the filtrate.

6. A process for the manufacture of leuco sulphuric ester derivatives of vat dyestuff and vat dyestuff intermediate compounds which comprises preparing a mixture consisting of a non-vattable organic amide of a carboxylic acid in which the hydrogen atoms attached to the amide nitrogen have been replaced by hydrocarbon radicles, a sulphur trioxide compound which will give rise to sulphur trioxide in the mixture and a diluent, adding to the mixture the vat compound in oxidized form and a metal selected from the group consisting of iron, nickel, copper and brass, stirring the mixture until the vat compound is converted to the leuco sulphuric ester derivative, adding the reaction mixture to an alkaline solution, and recovering the leuco sulphuric ester derivatives from the solution.

SAMUEL COFFEY.
GEORGE WILLIAM DRIVER.
DAVID ALEXANDER
  WHYTE FAIRWEATHER.
FRANCIS IRVING.

REFERENCES CITED

The following references are of record in the file of this patent:

UNITED STATES PATENTS

| Number | Name | Date |
|---|---|---|
| 1,058,019 | Schmidt | Apr. 1, 1913 |
| 1,784,379 | Munch | Dec. 9, 1930 |
| 1,949,299 | Fairweather et al | Feb. 27, 1934 |